UNITED STATES PATENT OFFICE.

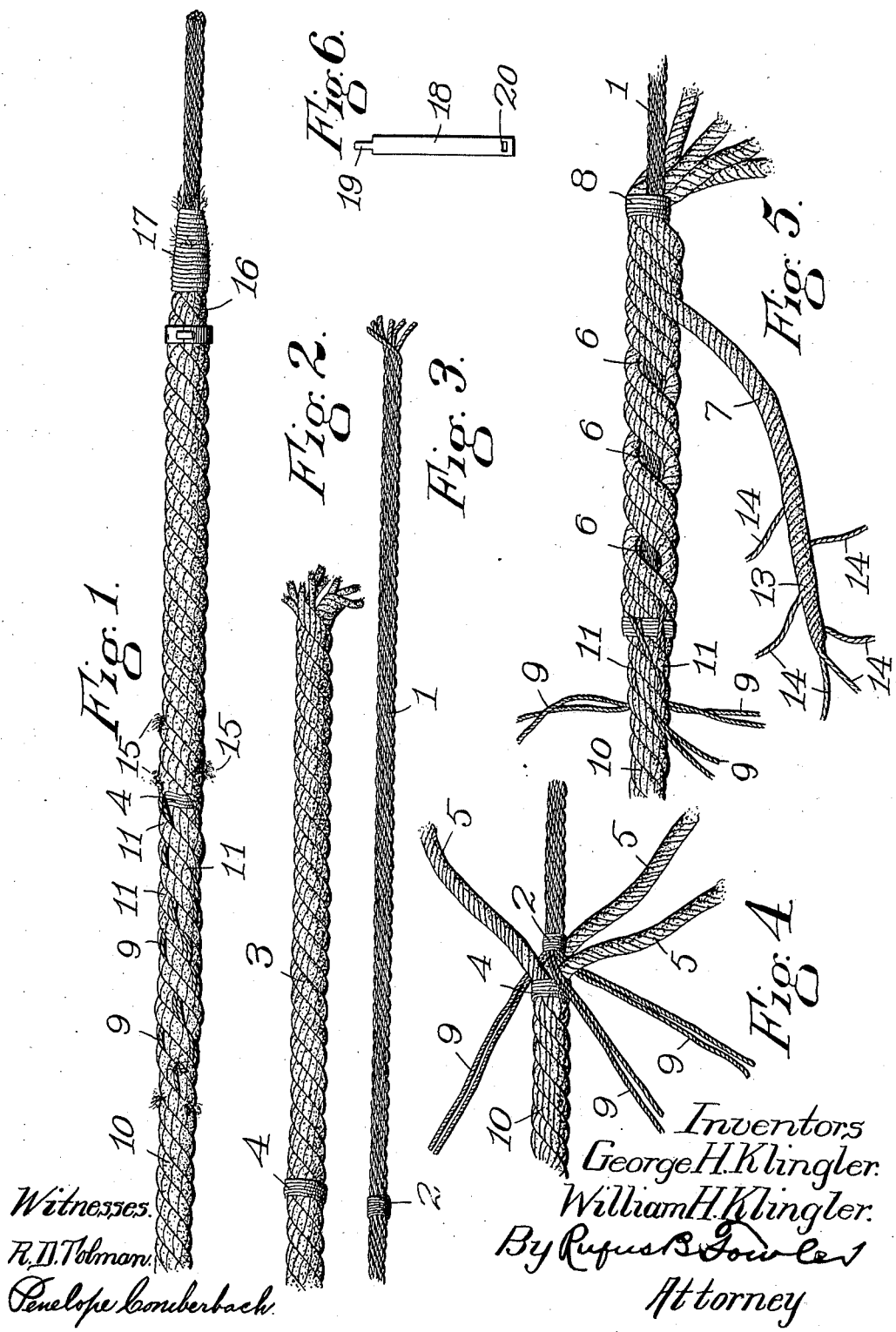

GEORGE H. KLINGLER AND WILLIAM H. KLINGLER, OF EMLENTON, PENNSYLVANIA, ASSIGNORS OF ONE-HALF TO WRIGHT WIRE COMPANY, OF WORCESTER, MASSACHUSETTS, A CORPORATION OF MASSACHUSETTS.

SPLICE BETWEEN MANILA AND WIRE CABLES.

1,026,869.  Specification of Letters Patent.  Patented May 21, 1912.

Application filed October 16, 1911. Serial No. 654,842.

*To all whom it may concern:*

Be it known that we, GEORGE H. KLINGLER and WILLIAM H. KLINGLER, both citizens of the United States, residing at Emlenton, in the county of Venango and State of Pennsylvania, have invented a new and useful Improvement in Splices Between Manila and Wire Cables, of which the following is a specification.

This invention relates to a splice between Manila and wire cables in which each cable is fastened at a certain distance from the end to hold the twist intact when interlocking, each cable between the end and the fastening is untwisted, the untwisted portions of the cable are interlocked, with the fastenings in contact, and the untwisted portion of each cable is then attached to the integral portion of the other cable beyond the fastening in the other cable.

The objects of our improvement are to facilitate and render more rapid the construction of the splice and to increase the strength of the connection between the cables by the splice.

In the accompanying drawing, Figure 1 shows Manila and wire cables connected by our improved splice. Figs. 2 and 3 show the first step in the process of making the splice in which both cables are fastened at certain distances from the end. Fig. 4 shows the untwisted portions of the cables beyond the fastenings interlocked, with the fastenings in contact. Fig. 5 shows the untwisted portion of each cable in the process of attachment to the integral portion of the other cable beyond the fastening in the other cable, and Fig. 6 is a plan view of the attaching strap unwound which is designed to hold the outer end of the Manila cable in contact with the surface of the wire cable, as shown in Fig. 1.

Similar reference characters refer to similar parts in the different figures.

The construction of our improved splice is as follows:—

First, a few turns of wire are wrapped around the wire cable 1 at 2, Fig. 3, preferably about seven feet from the end, and a few turns of marline are wrapped around the Manila cable 3 at 4, Fig. 2, preferably about five feet from the end. These fastenings 2 and 4 are to hold the natural twist in the cables intact during the construction of the splice.

Second, each cable is untwisted from its end to the fastenings at 2 and 4 and the core of the wire cable 1 is removed. The untwisted portions of the cables are then interlocked with the fastenings 2 and 4 brought into proximity, as shown in Fig. 4.

Third, the strands 5 of the Manila cable 3 are placed in a parallel position and are wound around the wire cable 1, as shown in Fig. 5. The strands 5 of the Manila cable 3 are arranged to be approximately parallel with the natural twist in the Manila cable 3 beyond the fastening 4, and, when the three strands 5 of the Manila cable 3 are arranged in position around the wire cable 1, there should be between each turn of the three strands 5 a space 6 sufficient to admit an additional Manila strand 7. The three Manila strands 5 are then temporarily secured to the wire cable 1 at 8, Fig. 5, at least ten inches before the ends of the strands 5 are reached.

Fourth, the strands 9 of the untwisted portion of the wire cable 1 are then inserted through the integral portion 10 of the Manila cable 3 by opening the Manila strands 11 in the portion 10 by a marline spike, or similar pointed instrument, in a manner similar to the customary method of splicing rope. The regularity of insertion is secured by tucking the same wire strand 9 over the corresponding Manila strand 11 in making each successive tuck, thereby insuring a straight splice. Seven or eight tucks are made, preferably each of parallel wire strands 9, side by side, as shown in Fig. 4. The parallel wire strands 9 of the first tuck may be intertwisted and the last tuck may be made of a single wire strand only. During the operation of tucking the Manila cable 3 at each complete set of tucks is successively wrapped with marline to hold it in position while the next tuck is being made. After the entire tucking is completed the ends of the wire strands 9 are clipped to leave them about one inch long. As shown in the drawing the present splice is constructed between a Manila cable 3 of three strands and a wire cable 1 of six, but cables having other numbers of strands may be spliced with equal facility by our improved process.

Fifth, the additional Manila strand 7 is fastened at 8 and is wound around the wire cable 1 in the spaces 6, with the twist of the additional strand 7 extending from the temporary fastening 8 toward the fastening 4 in the Manila cable 3. Beginning about one foot from the fastening 4 the additional strand 7 is divided into a number of equal parts, with each part arranged at different distances from the end 13 of the additional strand 7, thereby accomplishing a gradual reduction of the diameter of the end 13 of the strand 7. In the present instance the end 13 of the strand 7 is divided into six equal parts 14, as shown in Fig. 5. The attachment of the end 13 of the strand 7 is accomplished by tucking each of the parts 14 between one of the Manila strands 5 and the wire cable 1. Each end 14 is then knotted to hold it in position, as shown at 15, Fig. 1.

Sixth, the four Manila strands 5 and 7 extending beyond the temporary fastening 8 are tapered a distance of about ten inches and are wound tightly around the wire cable 1, as shown at 16, Fig. 1. Any convenient method of attachment may be employed to secure the tapered strands 5 and 7 to the wire cable 1.

In Fig. 1 we have shown a wire 17 wrapped around the taper 16 and also an iron strap 18, shown in plan view in Fig. 6. The strap 18 is provided with a tongue 19 at one end which is inserted through a mortise 20 and bent backwardly to join the ends of the strap and hold it tightly around the cable.

We claim,

1. A splice between a Manila cable and a wire cable, with a portion of one end of said Manila cable and of said wire cable untwisted and interlocked, of strands of the untwisted portion of said wire cable inserted beneath the strands of the integral portion of the Manila cable, the untwisted portion of said Manila cable being wound around the integral portion of said wire cable by a twist approximately parallel to the natural twist of said Manila cable, with an additional strand of Manila cable wound around said integral portion of said wire cable between the successive twists of said untwisted portion of said Manila cable.

2. A splice between a Manila cable and a wire cable, with each cable fastened near its ends to limit the untwisting and having the portion of each cable between said fastening and its end untwisted and interlocked, and with strands of the untwisted portion of said wire cable inserted beneath the strands of the integral portion of said Manila cable, the untwisted portion of said Manila cable being wound around the integral portion of said wire cable arranged to leave spaces between successive turns of said untwisted portion, and with an additional strand of Manila cable wound around said integral portion of said wire cable in said spaces between said successive twists.

3. A splice between a Manila cable and a wire cable, with a portion of one end each of said Manila cable and of said wire cable untwisted and interlocked, the strands of the untwisted portion of said wire cable inserted beneath the strands of the integral portion of said Manila cable, the untwisted portion of said Manila cable wound around the integral portion of said wire cable arranged to leave spaces between successive turns of said untwisted portion, with an additional strand of Manila cable wound around said integral portion of said wire cable in said spaces between successive turns, and means for attaching the ends of said untwisted portion of said Manila cable and the end of said additional strand to said wire cable.

4. A splice between a Manila cable and a wire cable, having untwisted strands of the wire cable inserted beneath the strands of the integral portion of the Manila cable, and untwisted strands of the Manila cable wound around the integral portion of the wire cable, with their ends tapered and secured to the wire cable.

5. A splice between a Manila cable and a wire cable, with the strands of the untwisted end of the wire cable inserted beneath the strands of the integral Manila cable, with untwisted strands of the Manila cable wound around the wire cable, with their ends attached thereto, and a metallic strap around said strands.

Dated this 26th day of September 1911.

GEORGE H. KLINGLER.
WILLIAM H. KLINGLER.

Witnesses:
MYRNA H. HEETER,
G. R. EICHBAUM.

Copies of this patent may be obtained for five cents each, by addressing the "Commissioner of Patents, Washington, D. C."